United States Patent
Matsumoto et al.

(10) Patent No.: US 12,033,798 B2
(45) Date of Patent: Jul. 9, 2024

(54) CERAMIC ELECTRONIC DEVICE AND MANUFACTURING METHOD OF CERAMIC ELECTRONIC DEVICE

(71) Applicant: TAIYO YUDEN CO., LTD., Tokyo (JP)

(72) Inventors: Yasuhiro Matsumoto, Takasaki (JP); Koichiro Morita, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 44 days.

(21) Appl. No.: 17/584,994

(22) Filed: Jan. 26, 2022

(65) Prior Publication Data
US 2022/0285094 A1 Sep. 8, 2022

(30) Foreign Application Priority Data
Mar. 4, 2021 (JP) ................. 2021-034341

(51) Int. Cl.
*H01G 4/10* (2006.01)
*H01G 4/008* (2006.01)
*H01G 4/30* (2006.01)

(52) U.S. Cl.
CPC .............. *H01G 4/10* (2013.01); *H01G 4/008* (2013.01); *H01G 4/30* (2013.01)

(58) Field of Classification Search
CPC ............ H01G 4/10; H01G 4/30; H01G 4/008; H01G 4/12; C04B 35/4682
USPC ............ 361/301.4, 321.1, 321.5, 303, 321.2, 361/321.4, 311
See application file for complete search history.

(56) References Cited

U.S. PATENT DOCUMENTS

| | | | |
|---|---|---|---|
| 9,870,865 B2* | 1/2018 | Kanzaki | H01G 4/0085 |
| 2002/0049131 A1* | 4/2002 | Kawamoto | C04B 35/4682 501/139 |
| 2006/0198078 A1* | 9/2006 | Miyauchi | H01G 4/008 361/305 |
| 2013/0027842 A1* | 1/2013 | Kim | H01G 4/1209 361/321.2 |
| 2013/0286539 A1* | 10/2013 | Kim | H01G 13/006 264/615 |
| 2017/0271082 A1* | 9/2017 | Yoon | H01G 4/228 |
| 2019/0051460 A1* | 2/2019 | Kawamura | H01G 4/0085 |
| 2019/0237264 A1 | 8/2019 | Sakurai et al. | |

FOREIGN PATENT DOCUMENTS

| | | |
|---|---|---|
| JP | 2007095382 A | 4/2007 |
| JP | 2019134098 A | 8/2019 |

* cited by examiner

*Primary Examiner* — Arun Ramaswamy
(74) *Attorney, Agent, or Firm* — Law Office of Katsuhiro Arai

(57) ABSTRACT

A ceramic electronic device includes a multilayer structure in which each of a plurality of dielectric layers and each of a plurality of internal electrode layers are alternately stacked. A main component of the plurality of dielectric layers is a ceramic having a perovskite structure of which an A site includes at least Ba and of which an A/B ratio is 0.980 or less. The plurality of internal electrode layers include a co-material. A total amount of Ti, Zr and Hf is 90 mol % or more in metal elements included in the co-material and an amount of Ba is 10 mol % or less in the metal elements.

10 Claims, 6 Drawing Sheets

CERAMIC ELECTRONIC DEVICE AND MANUFACTURING METHOD OF CERAMIC ELECTRONIC DEVICE

CROSS-REFERENCE TO RELATED APPLICATION

This application is based upon and claims the benefit of priority of the prior Japanese Patent Application No. 2021-034341, filed on Mar. 4, 2021, the entire contents of which are incorporated herein by reference.

FIELD

A certain aspect of the present invention relates to a ceramic electronic device and a manufacturing method of a ceramic electronic device.

BACKGROUND

Ceramic electronic device such as multilayer ceramic capacitors are being used in order to remove noise in a high frequency communication system of which a representative is a mobile phone (for example, see Japanese Patent Application No. 2007-095382 and Japanese Patent Application Publication No. 2019-134098).

SUMMARY OF THE INVENTION

According to an aspect of the present invention, there is provided a ceramic electronic device including: a multilayer structure in which each of a plurality of dielectric layers and each of a plurality of internal electrode layers are alternately stacked, wherein a main component of the plurality of dielectric layers is a ceramic having a perovskite structure of which an A site includes at least Ba and of which an A/B ratio is 0.980 or less, wherein the plurality of internal electrode layers include a co-material, wherein a total amount of Ti, Zr and Hf is 90 mol % or more in metal elements included in the co-material and an amount of Ba is 10 mol % or less in the metal elements.

A manufacturing method of a ceramic electronic device includes: forming a multilayer structure by stacking a plurality of stack units in which a pattern of a metal conductive paste including a co-material is printed on a dielectric green sheet of a dielectric material including a ceramic material powder, the ceramic material powder having a perovskite structure of which an A site includes at least Ba and of which an A/B ratio is 0.980 or less, a total amount of Ti, Zr and Hf being 90 mol % or more in metal elements included in the co-material, an amount of Ba in the metal elements being 10 mol % or less; and firing the multilayer structure.

DETAILED DESCRIPTION

The mobile phone needs a ceramic electronic device which has a small size, is thin, and has a large capacity. In order to meets the needs, it is favorable that internal electrode layers which has high continuity characteristic even if the thickness of the ceramic electronic device is reduced.

For example, it is possible to improve the reliability of the ceramic electronic device, by adding a co-material to internal electrode layers, increasing a sintering temperature of the internal electrode layers toward a sintering temperature of the dielectric material of the dielectric layer, and increasing a continuity modulus of the internal electrode layers. However, a co-material including a large amount of Ba is used with respect to dielectric layers of which a main component is a dielectric material having a perovskite structure of which an A site includes at least Ba (barium) and of which an A/B ratio is 0.980 or less, the co-material extruded from the internal electrode layers diffuses into the dielectric material of the dielectric layers, abnormal grain growth may occur, and the reliability may be insufficient.

A description will be given of an embodiment with reference to the accompanying drawings.

EMBODIMENT

Figure 1:
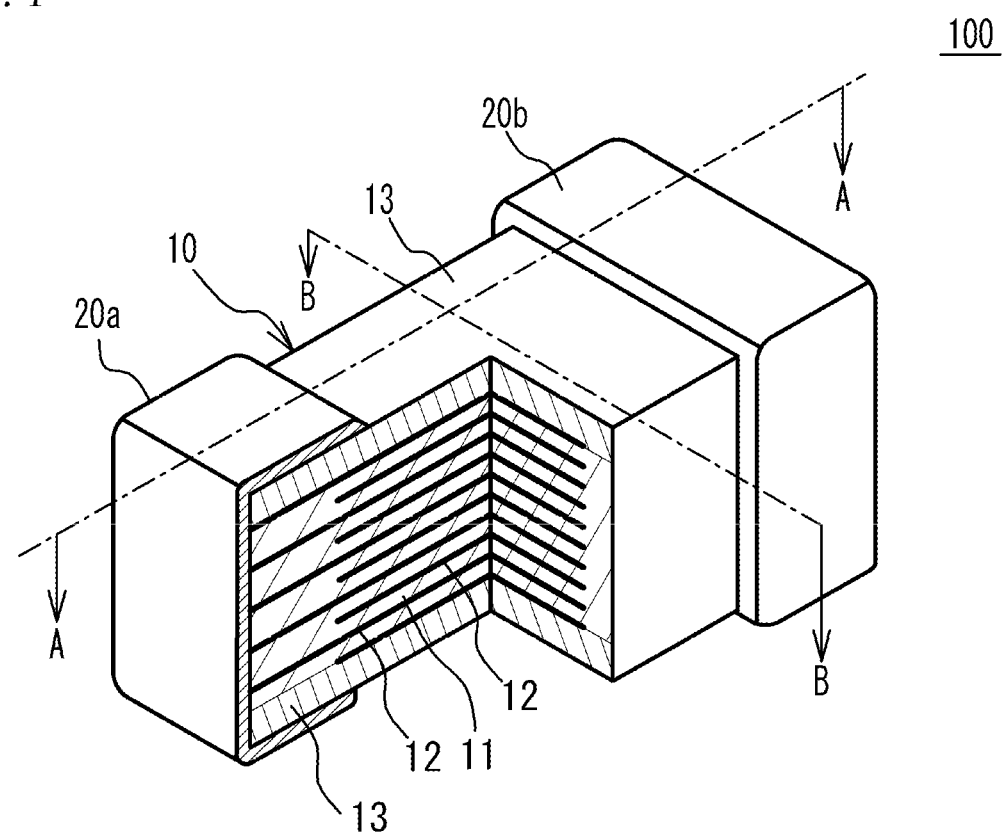
FIG. 1 illustrates a perspective view of a multilayer ceramic capacitor in which a cross section of a part of the multilayer ceramic capacitor is illustrated.
Figure 2:
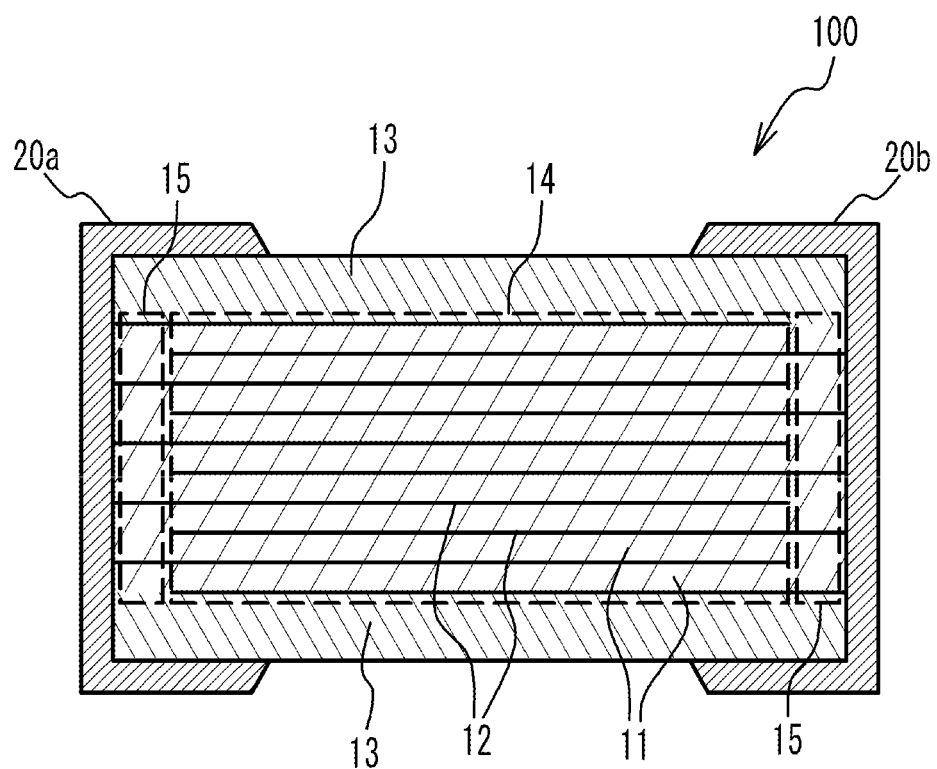
FIG. 2 illustrates a cross section taken along a line A-A of FIG. 1.
Figure 3:
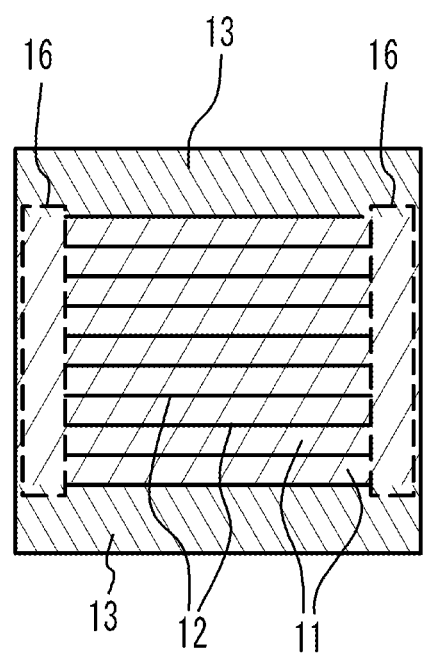
FIG. 3 illustrates a cross section taken along a line B-B of FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. An A site of the ceramic material includes at least Ba. The ceramic material may be $BaTiO_3$ (barium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure or the like.

An average thickness of each of the internal electrode layers 12 may be, for example, 1.5 μm or less. The average thickness may be 1.0 μm or less. The average thickness may be 0.7 μm or less. An average thickness of each of the dielectric layers 11 may be, for example, 5.0 μm or less. The average thickness may be 3.0 μm or less. The average thickness may be 1.0 μm or less.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

When the continuity modulus of the internal electrode layer 12 is reduced in the multilayer ceramic capacitor 100, electric field is concentrated near the internal electrode layer 12 during applying a voltage to the multilayer ceramic capacitor 100. In this case, the reliability may be reduced. Therefore, there is strong positive correlation between the continuity modulus of the internal electrode layer 12 and the reliability. Factors for reducing the continuity modulus of the internal electrode layer 12 are such as a difference between temperatures of the dielectric layers 11 and the internal electrode layers 12 at which materials are sintered and contract, abnormal grain growth of the material of the dielectric layers 11, and so on. The abnormal grain growth may be defined as grain growth in which grains of the mixed main component ceramic becomes more than five times.

Accordingly, in the embodiment, ceramic of which an atomic concentration ratio A/B (an atomic concentration ratio between the A site element and the B site element) is used as the main component ceramic of the dielectric layer 11. A composition ratio of non-stoichiometry can suppress the grain growth of the dielectric layer 11.

When a co-material is added to the internal electrode layer 12, a sintering temperature of the internal electrode layer 12 is increased (sintering is delayed). The sintering temperature gets closer to that of the dielectric material of the dielectric layer 11. In this case, a continuity modulus of the internal electrode layer 12 can be improved. A part of the co-material diffuses to the dielectric layer 11 from inside of the internal electrode layer 12, in a sintering process of the internal electrode layer 12. Therefore, it is thought that the co-material has the same composition as the dielectric layer 11 or the composition of the co-material is close to that of the dielectric layer 11.

For example, Japanese Patent Application Publication No. 2007-095382 discloses that when barium titanate of which the A/B ratio is more than 1 is used as a co-material, grain growth of a dielectric material of the dielectric layer of which the A/B ratio is more than 1 is suppressed and reliability is improved. However, Ba diffusing from the internal electrode layer 12 causes abnormal grain growth of the dielectric material, the continuity modulus of the internal electrode layer 12 is reduced, and the reliability may be insufficient, when a co-material of which a main component is barium titanate including a lot of Ba is used and the main component ceramic of which the A/B ratio is 0.980 or less is used in the dielectric layer 11.

Accordingly, in the embodiment, the co-material, of which a total amount of Ti, Zr and Hf is 90 mol % or more in the metal elements included in the co-material and an amount of Ba is 10 mol % or less, is used. For example, $TiO_2$, $ZrO_2$, or $HfO_2$ is used as the co-material. Thus, the diffusion of Ba into the dielectric layer 11 does not occur. Alternatively, the diffusion of Ba into the dielectric layer 11 is suppressed. Therefore, the continuity modulus of the internal electrode layer 12 is improved. And the reliability is improved.

In the embodiment, the A/B ratio of the main component ceramic of the dielectric layer 11 is designed to be 0.980 or less (non-stoichiometry). Therefore, the grain growth or fluctuation of characteristic with respect to the A/B ratio of the main component ceramic of the dielectric layer 11 is suppressed. Even if $TiO_2$, $ZrO_2$ or $HfO_2$ diffuses into the internal electrode layer 12, $TiO_2$, $ZrO_2$ or $HfO_2$ tends to be solid-solved into the B site of the main component ceramic of the dielectric layer 11 because Ti, Zr and Hf are 4 group elements and easily have a valence of 4. Therefore, the characteristic changing is suppressed, and the abnormal grain growth is suppressed.

When a general A-rich (A/B>1) dielectric material is used as the main component ceramic of the dielectric layer 11 and the main component of the co-material is $TiO_2$, $ZrO_2$ or $HfO_2$, $TiO_2$, $ZrO_2$ or $HfO_2$ diffuses into the dielectric layer 11 and causes the abnormal grain growth and the reliability may be degraded. When an A-poor dielectric material around stoichiometry (0.980<A/B ratio≤1) is used as the main component ceramic of the dielectric layer 11 and the main component of the co-material is $TiO_2$, $ZrO_2$ or $HfO_2$, the reliability may be improved more than the case where barium titanate is used as the co-material. However, the A-poor dielectric material (0.980<A/B ratio≤1) originally tends to cause the abnormal grain growth. Therefore, the reliability may be degraded. Moreover, the A/B ratio of the dielectric material fluctuates and electrical characteristic of the dielectric material may be largely changed, because of the diffusion of $TiO_2$, $ZrO_2$ or $HfO_2$ into the dielectric material.

As mentioned above, the A/B ratio of the main component ceramic of the dielectric material is 0.980 or less, and the co-material, of which a total amount of Ti, Zr and Hf is 90 mol % or more in the metal elements included in the co-material and an amount of Ba is 10 mol % or less, is used. Therefore, the continuity modulus of the internal electrode layer 12 is improved. Moreover, the reliability of the multilayer ceramic capacitor 100 is improved.

Japanese Patent Application Publication No. 2019-134098 discloses that IR (Insulation Resistance) characteristic and high temperature loaded lifetime are improved by using a co-material of which a concentration of Zr is higher than that of the main component ceramic of a dielectric layer 11. In the document, the main component of the co-material is $BaTi_{1-z}Zr_zO_3$ which is a $BaTiO_3$-based perovskite compound including Ba. Therefore, the composition and the function mechanism of the co-material of Japanese Patent Application Publication No. 2019-134098 are different from those of the embodiment. For example, in the embodiment, the main component ceramic of the dielectric layer 11 is the dielectric material of which the A/B ratio is 0.980 or less. The diffusion of Ba from the internal electrode layer 12 is suppressed. The reaction between Ba and the shell phase in which Ti, Zr or Hf is rich is suppressed. Thus, the abnormal grain growth near the internal electrode layer 12 is suppressed. It is therefore favorable that the amount of Ba is small. The co-material of the embodiment is essentially different from the co-material of $Ti_{1-z}Zr_zO_3$ of which the Zr concentration is high.

Figure 4:
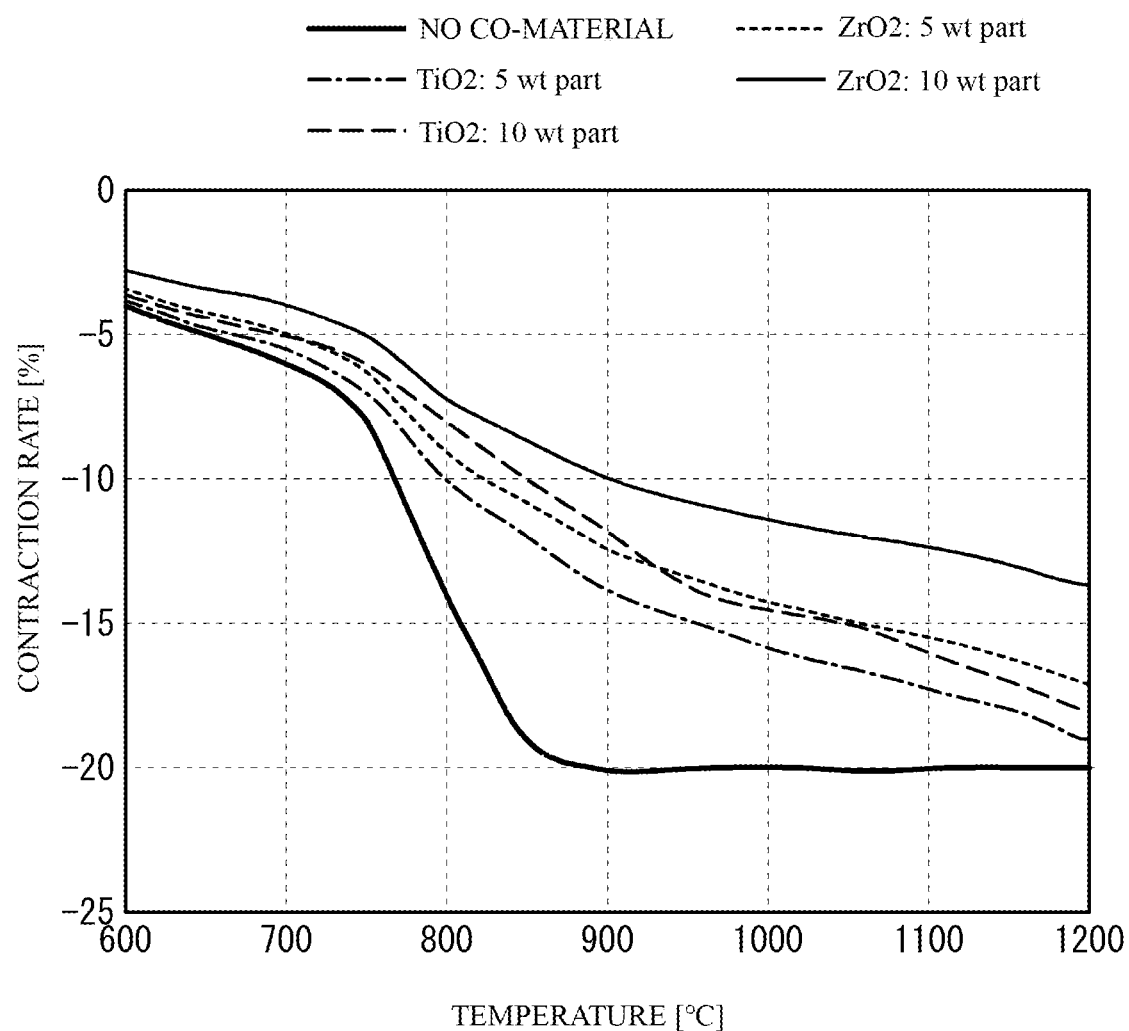
FIG. 4 illustrates results of TMA of cylindrical sample of Ni.

FIG. 4 illustrates results of TMA (Thermomechanical Analysis) of cylindrical sample of Ni. The sample was formed by adding $TiO_2$, $ZrO_2$ or the like to Ni paste, drying the resulting Ni paste, adding a binder to the resulting Ni paste, granulating the resulting Ni paste, and forming the cylinder shape with use of a pressing machine. When $TiO_2$ or $ZrO_2$ was added, the sintering was more delayed than the sample without the co-material. If the weight part of $TiO_2$ is the same as that of $ZrO_2$, the sample to which $ZrO_2$ was more delayed. Hf belongs to the same group as Zr. The chemical characteristic of $HfO_2$ was almost the same as that of $ZrO_2$. Therefore, it is thought that the sample to which $HfO_2$ was delayed as well as $ZrO_2$. Therefore, $TiO_2$, $ZrO_2$ and $HfO_2$ act as the co-material preventing the sintering of the metal material in the internal electrode layer 12. However, as mentioned above, the co-material causes abnormal grain growth of a general dielectric material of which the A/B ratio is more than 0.980. Therefore, the co-material is not suitable and is not used. The co-material is useful with respect to the dielectric material of which the A/B ratio is 0.980 or more in the multilayer ceramic capacitor.

When the amount of the co-material is small in the internal electrode layer 12, it may not necessarily be possible to sufficiently increase the sintering temperature. Accordingly, it is preferable that the amount of the co-material in the internal electrode layer 12 has a lower limit. For example, it is preferable that the amount of the co-material in the internal electrode layer 12 is 5 mass % or more. It is more preferable that the amount of the co-material in the internal electrode layer 12 is 7.5 mass % or more. It is still more preferable that the amount of the co-material in the internal electrode layer 12 is 10 mass % or more.

When the amount of the co-material is large in the internal electrode layer 12, conductivity of the internal electrode layer 12 may be degraded and the function as an electrode may not be necessarily achieved. Accordingly it is preferable that the amount of the co-material in the internal electrode layer 12 has an upper limit. For example, it is preferable that the amount of the co-material in the internal electrode layer 12 is 30 mass % or less. It is more preferable that the amount of the co-material in the internal electrode layer 12 is 25 mass % or less. It is still more preferable that the amount of the co-material in the internal electrode layer 12 is 20 mass % or less.

It is preferable that the co-material in the internal electrode layer 12 is $TiO_2$, $ZrO_2$ or $HfO_2$. A combination thereof may be used. When the combination is used, a total amount of Ti, Zr and Hf is 90 mol % or more in the metal elements included in the co-material and an amount of Ba is 10 mol % or less. For example, ceramic including Ba such as $BaTiO_3$ may be included in the co-material.

Figure 5:
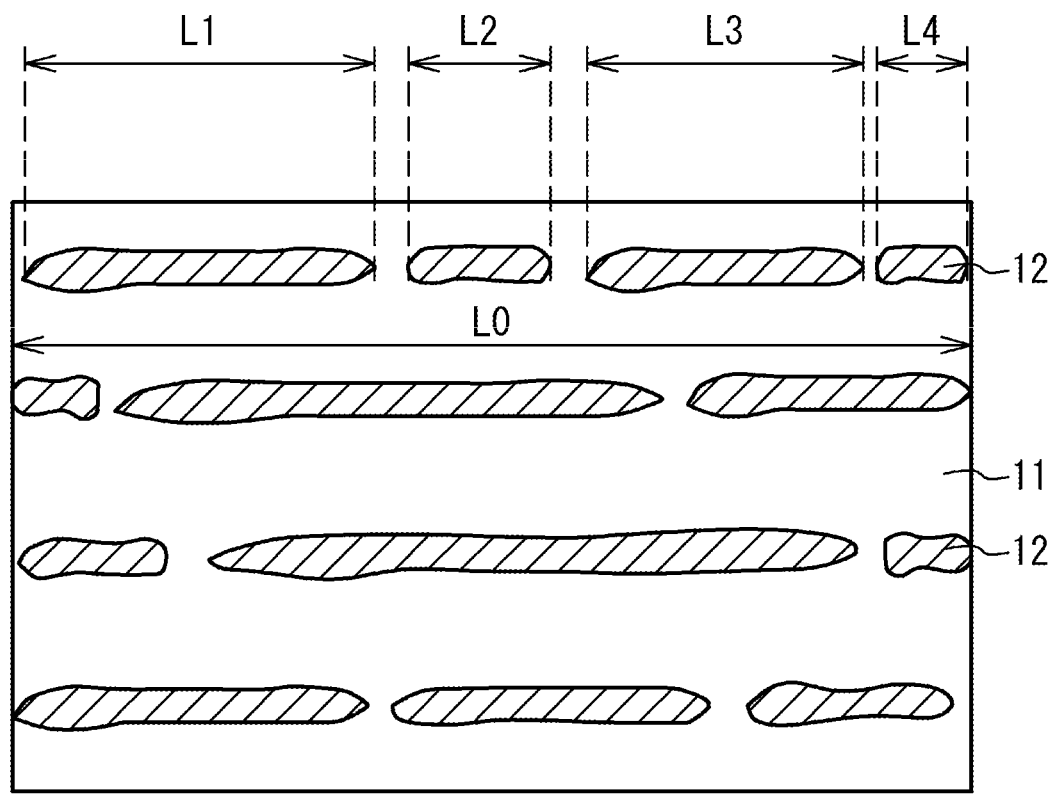
FIG. 5 illustrates a continuity modulus.

For example, it is preferable that the continuity modulus of the internal electrode layer 12 is 80% or more. FIG. 5 illustrates the continuity modulus. As illustrated in FIG. 5, in an observation area having a length L0 in the internal electrode layer 12, lengths L1, L2 to Ln of metal portions are measured and summed. A ratio of the metal portions $\Sigma Ln/L_0$ can be defined as the continuity modulus. It is preferable that the continuity modulus of the internal electrode layer 12 is 85% or more. It is more preferable that the continuity modulus of the internal electrode layer 12 is 90% or more.

From a viewpoint of suppressing grain growth of the dielectric layer 11, it is preferable that the A/B ratio of the main component ceramic of the dielectric layer 11 is 0.98 or less. It is more preferable that the A/B ratio is 0.96 or less. From a viewpoint of high dielectric constant, the A/B ratio of the main component ceramic of the dielectric layer 11 is 0.90 or more. It is still more preferable that the A/B ratio is 0.94 or more.

A base of the main component ceramic of the dielectric layer 11 is barium titanate. At least one of $ZrO_2$ and $HfO_2$ may be solid-solved in barium titanate. In this case, the main component ceramic of the dielectric layer 11 has a core-shell structure including a core of which a main component is barium titanate and a shell which is a diffusion layer in which Ti, Zr or Hf is rich.

Figure 6:
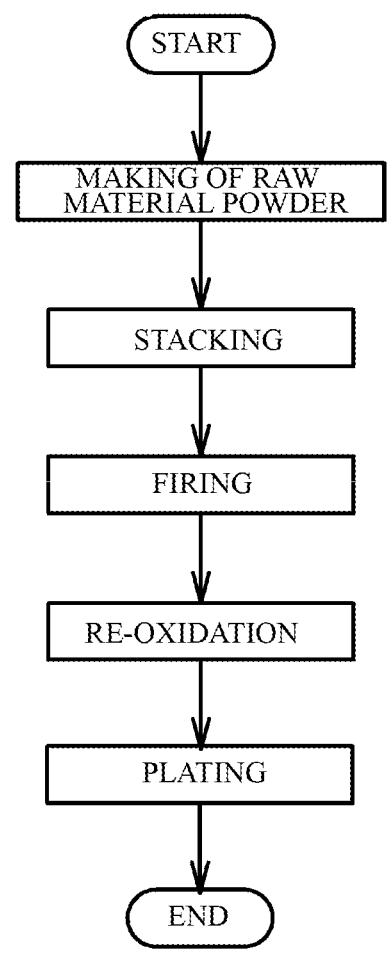
FIG. 6 illustrates a manufacturing method of a multilayer ceramic capacitor.

Next, a description will be given of a manufacturing method of the multilayer ceramic capacitor 100. FIG. 6 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Each material is weighed so that the A/B ratio is 0.980 or less in a perovskite structure after synthesizing. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to resulting ceramic powders, in accordance with purposes. The additive compound may be an oxide of Zr, Mg, Mn, V (vanadium), Cr (chromium), oxide of Eu, or an oxide of Co (cobalt), Ni, Li (lithium), B (boron), Na (sodium), K (potassium) and Si, or glass. If necessary, oxide of a rare earth element (Sc (scandium), Y, La (lanthanum), Ce (cerium), Pr (praseodymium), Nd (neodymium), Pm (promethium), Sm (samarium), Gd (gadolinium), Tb (terbium), Dy, Ho (holmium), Er (erbium), Tm (thulium), Yb (ytterbium) or Lu (lutetium) may be used.

For example, a compound including the additive compound is wet-blended with the resulting ceramic raw material, is dried and crushed into a ceramic material. For example, the grain diameter may be adjusted by crushing the resulting ceramic material as needed. Alternatively, the grain diameter of the resulting ceramic material may be adjusted by combining the crushing and classifying. Thus, the dielectric material is formed.

(Stacking process) Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet with a thickness of 0.5 μm or more is painted on a base material by, for example, a die coater method or a doctor blade method, and then dried.

Next, metal conductive paste for forming an internal electrode is applied to the surface of the dielectric green sheet by screen printing or gravure printing. The metal conductive paste includes an organic binder. The co-material, of which a total amount of Ti, Zr and Hf is 90 mol % or more in the metal elements included in the co-material and an amount of Ba is 10 mol % or less, is added to the metal conductive paste.

After that, the dielectric green sheets on which the internal electrode pattern is printed is cut into a predetermined size. Then, the dielectric green sheets are alternately stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to the pair of external electrodes 20a and 20b of different polarizations. For example, a total number of the staked dielectric green sheets is 100 to 1000. Cover sheets for forming the cover layers 13 are crimped on the stacked dielectric green sheets and under the stacked dielectric green sheets. The resulting stacked dielectric green sheets are cut into a predetermined chip size (for example, 1.0 mm×0.5 mm).

(Firing process) The binder is removed from the ceramic multilayer structure in $N_2$ atmosphere. An Ni paste that will become the base layers of the external electrodes 20a and 20b is applied to the ceramic multilayer structure by a dipping method. The resulting ceramic multilayer structure is fired for ten minutes to 2 hours in a reductive atmosphere having an oxygen partial pressure of $10^{-12}$ to $10^{-9}$ atm in a temperature range of 1100 degrees C. to 1300 degrees C. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C.

(Plating process) After that, by a plating method, metal layers such as Cu, Ni, Sn or the like may be plated on the external electrodes 20a and 20b. With the processes, the multilayer ceramic capacitor 100 is manufactured.

In the manufacturing method of the embodiment, the A/B ratio of the main component ceramic of the dielectric material is 0.980 or less, and the co-material, of which a total amount of Ti, Zr and Hf is 90 mol % or more in the metal elements included in the co-material and an amount of Ba is 10 mol % or less, is used. Therefore, the continuity modulus of the internal electrode layer 12 is improved. Moreover, the reliability of the multilayer ceramic capacitor 100 is improved.

When the amount of the co-material is small in the metal conductive paste in the internal electrode pattern, it may not necessarily be possible to sufficiently increase the sintering temperature. Accordingly, it is preferable that the amount of the co-material in the metal conductive pater has a lower limit. For example, it is preferable that the amount of the co-material in the metal conductive paste is 5 mass % or more. It is more preferable that the amount of the co-material in the metal conductive paste is 7.5 mass % or more. It is still more preferable that the amount of the co-material in the metal conductive paste is 10 mass % or more.

When the amount of the co-material is large in the metal conductive paste in the internal electrode pattern, conductivity of the internal electrode layer 12 may be degraded and the function as an electrode may not be necessarily achieved. Accordingly it is preferable that the amount of the co-material in the metal conductive paste has an upper limit. For example, it is preferable that the amount of the co-material in the metal conductive paste is 30 mass % or less. It is more preferable that the amount of the co-material in the metal conductive paste is 25 mass % or less. It is still more preferable that the amount of the co-material in the metal conductive paste is 20 mass % or less.

It is preferable that the co-material in the metal conductive paste is $TiO_2$, $ZrO_2$ or $HfO_2$. A combination thereof may be used. When the combination is used, a total amount of Ti, Zr and Hf is 90 mol % or more in the metal elements included in the co-material and an amount of Ba is 10 mol % or less. For example, ceramic including Ba such as $BaTiO_3$ may be included in the co-material.

From a viewpoint of suppressing grain growth of the dielectric layer 11, it is preferable that a A/B ratio of the main component ceramic of the dielectric material is 0.98 or less. It is more preferable that the A/B ratio is 0.96 or less. From a viewpoint of high dielectric constant, the A/B ratio of the main component ceramic of the dielectric material is 0.90 or more. It is still more preferable that the A/B ratio is 0.94 or more.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

(Example 1) Barium titanate of which the A/B ratio was 0.960, each additive compound, and an organic solvent were weighed at a predetermined ratio. The resulting material was mixed and crushed with use of zirconia beads of which ϕ was 0.5 mm. Thus the dielectric material was formed. Diameters of samples of the slurry was measured after dispersing with use of a grain diameter distribution measurer. A binder was added to the slurry. Dielectric green sheets were formed having a thickness of 2.5 μm with use of the slurry. Ni paste in which each co-material was added and kneaded was printed on the dielectric green sheets. $ZrO_2$ was used as the co-material. An amount of the co-material was 10 weight part with respect to Ni. A printed amount of the Ni paste was approximately 3 μg/mm². 10 numbers of the dielectric green sheets on which the Ni paste was printed were stacked. Each cover sheet was crimped on an under the stacked dielectric green sheets. The ceramic multilayer structure was cut into a predetermined size. The binder was removed from the resulting ceramic multilayer structure in $N_2$ atmosphere. After that, metal conductive paste to be the base layers of the external electrodes was applied to the ceramic multilayer structure and dried. After that, the ceramic multilayer structure was fired in a reductive atmosphere.

(Example 2) $ZrO_2$ was used as the co-material in an example 2. The amount of the co-material was 5 weight part with respect to Ni. Other conditions were the same as those of the example 1.

(Example 3) $TiO_2$ was used as the co-material in an example 3. The amount of the co-material was 10 weight part with respect to Ni. Other conditions were the same as those of the example 1.

(Example 4) $TiO_2$ was used as the co-material in an example 4. The amount of the co-material was 5 weight part with respect to Ni. Other conditions were the same as those of the example 1.

(Example 5) The A/B ratio of the barium titanate of the dielectric material was 0.980 in an example 5. $ZrO_2$ was used as the co-material. The amount of the co-material was 10 weight part with respect to Ni. Other conditions were the same as those of the example 1.

(Example 6) The A/B ratio of the barium titanate of the dielectric material was 0.940 in an example 5. $ZrO_2$ was used as the co-material. The amount of the co-material was 10 weight part with respect to Ni. Other conditions were the same as those of the example 1.

(Comparative example 1) In a comparative example 1, the co-material was not added to the metal conductive paste for forming internal electrode layer. Other conditions were the same as those of the example 1.

(Comparative example 2) $BaTiO_3$ was used as the co-material in a comparative example 2. The amount of the co-material was 10 weight part with respect to Ni. Other conditions were the same as those of the example 1.

(Comparative example 3) $BaCO_3$ was used as the co-material in a comparative example 3. The amount of the co-material was 10 weight part with respect to Ni. Other conditions were the same as those of the example 1.

(Comparative example 4) The A/B ratio of the barium titanate of the dielectric material was 1.010 in a comparative example 4. Other conditions were the same as those of the example 1.

(Comparative example 5) The A/B ratio of the barium titanate of the dielectric material was 0.990 in a comparative example 5. Other conditions were the same as those of the comparative example 2.

(Comparative example 6) The A/B ratio of the barium titanate of the dielectric material was 0.990 in a comparative example 6. Other conditions were the same as those of the example 1.

A capacity was measured with respect to each multilayer ceramic capacitor of the examples 1 to 6 and the comparative examples 1 to 6, by using an LCR meter. The continuity modulus of the internal electrode layer was calculated by grinding each sample buried in resin, observing with use of a laser micro scope and using an image analysis software. It is possible to calculate the continuity modulus of the internal electrode layer by dividing a total length of continuous electrode parts by an all length of the internal electrode layer in the grinded cross section. Moreover, dielectric grains in each sample buried in the resin were observed by using SEM. When the grain growth in which a part of dielectric grains became more than five times of the mixed barium titanate, it was determined that the abnormal grain growth occurred in the sample. The highly accelerated lifetime was measured by applying a voltage of 50V to 1 μm thickness of the dielectric layers at 125 degrees C. after the firing. When the average of the HALT of a sample was 3000 min or more, the sample was determined as good "○". The amounts of elements in the co-material were measured by performing EDS analysis with use of SEM or TEM. Table 1 shows the results.

TABLE 1

| | CO-MATERIAL AND WEIGHT PART | | A/B RATIO | CAPACITY (nF) | ABNORMAL GRAIN GROWTH | CONTINUITY MODULUS (%) | AVERAGE LIFETIME (min) | DETERMINATION |
|---|---|---|---|---|---|---|---|---|
| EXAMPLE 1 | $ZrO_2$ | 10 | 0.960 | 27 | none | 94 | 5405 | ○ |
| EXAMPLE 2 | $ZrO_2$ | 5 | 0.960 | 28 | none | 89 | 5132 | ○ |
| EXAMPLE 3 | $TiO_2$ | 10 | 0.960 | 28 | none | 90 | 5175 | ○ |
| EXAMPLE 4 | $TiO_2$ | 5 | 0.960 | 30 | none | 85 | 4563 | ○ |
| EXAMPLE 5 | $ZrO_2$ | 10 | 0.980 | 29 | none | 83 | 3237 | ○ |
| EXAMPLE 6 | $ZrO_2$ | 10 | 0.940 | 25 | none | 95 | 4821 | ○ |
| COMPARATIVE EXAMPLE 1 | none | 0 | 0.960 | 23 | none | 73 | 342 | x |
| COMPARATIVE EXAMPLE 2 | $BaTiO_3$ | 10 | 0.960 | 25 | occurred | 78 | 2542 | x |
| COMPARATIVE EXAMPLE 3 | $BaTiO_3$ | 10 | 0.960 | 43 | occurred | 56 | 0 | x |
| COMPARATIVE EXAMPLE 4 | $ZrO_2$ | 10 | 1.010 | 62 | occurred | 53 | 0 | x |

TABLE 1-continued

| | CO-MATERIAL AND WEIGHT PART | | A/B RATIO | CAPACITY (nF) | ABNORMAL GRAIN GROWTH | CONTINUITY MODULUS (%) | AVERAGE LIFETIME (min) | DETERMINATION |
|---|---|---|---|---|---|---|---|---|
| COMPARATIVE EXAMPLE 5 | $BaTiO_3$ | 10 | 0.990 | 51 | occurred | 59 | 239 | x |
| COMPARATIVE EXAMPLE 6 | $ZrO_2$ | 10 | 0.990 | 48 | occurred | 65 | 1023 | x |

The comparative example 1 was determined as bad "x". It is thought that this was because the co-material was not added and the continuity modulus was reduced. The comparative example 2 was determined as bad "x". It is thought that this was because $BaTiO_3$ was used as the co-material, a large amount of Ba diffused into the dielectric layer and caused the abnormal grain growth, and the continuity modulus was reduced. The comparative example 3 was determined as bad "x". It is thought that this was because $BaCO_3$ was used as the co-material, a large amount of Ba diffused into the dielectric layer and caused the abnormal grain growth, and the continuity modulus was reduced. The comparative example 4 was determined as bad "x". It is thought that this was because the A/B ratio of the dielectric material which was more than 0.980 caused the abnormal grain growth, and the continuity modulus was reduced. The comparative example 5 was determined as bad "x". It is thought that this was because $BaTiO_3$ was used as the co-material, a large amount of Ba diffused into the dielectric layer and caused the abnormal grain growth, and the continuity modulus was reduced. It is also thought that this was because the A/B ratio of the dielectric material which was more than 0.980 caused the abnormal grain growth, and the continuity modulus was reduced. The comparative example 6 was determined as bad "x". It is thought that this was because the A/B ratio of the dielectric material which was more than 0.980 caused the abnormal grain growth, and the continuity modulus was reduced.

In contrast, the examples 1 to 6 were determined as good "0". It is thought that this was because the ceramic of which the A/B ratio was 0.980 or less was used as the main component ceramic of the dielectric material, and the co-material, of which a total amount of Ti, Zr and Hf was 90 mol % or more in the metal elements included in the co-material and an amount of Ba is 10 mol % or less, was used.

Although the embodiments of the present invention have been described in detail, it is to be understood that the various change, substitutions, and alterations could be made hereto without departing from the spirit and scope of the invention.

What is claimed is:

1. A ceramic electronic device comprising:
   a multilayer structure in which each of a plurality of dielectric layers and each of a plurality of internal electrode layers are alternately stacked,
   wherein a main component of the plurality of dielectric layers includes a perovskite structure expressed by a general formula $ABO_3$ wherein A represents an A site element and B represents a B site element in which the A site element includes at least Ba, and an A/B ratio by atomic concentration of the plurality of dielectric layers is 0.980 or less,
   wherein the plurality of internal electrode layers include a co-material,
   wherein a total amount of Ti, Zr and Hf is 90 mol % or more in metal elements included in the co-material and an amount of Ba is 10 mol % or less in the metal elements, and
   wherein the main component of the plurality of dielectric layers is barium titanate in which at least one of $ZrO_2$ and $HfO_2$ is solid-solved.

2. The ceramic electronic device as claimed in claim 1, wherein a continuity modulus of the plurality of internal electrode layers is 80% or more.

3. The ceramic electronic device as claimed in claim 1, wherein a ratio of the co-material in the plurality of internal electrode layers is 5 mass % or more and 30 mass % or less.

4. The ceramic electronic device as claimed in claim 1, wherein the co-material is $TiO_2$, $ZrO_2$ or $HfO_2$.

5. The ceramic electronic device as claimed in claim 1, wherein the plurality of dielectric layers do not include any Ho.

6. The ceramic electronic device as claimed in claim 1, wherein the plurality of dielectric layers include a core-shell structure having a core of which a main component is barium titanate and a shell which is a diffusion layer in which Ti, Zr or Hf is richer than the core.

7. A manufacturing method of a ceramic electronic device comprising;
   forming a multilayer structure by stacking a plurality of stack units wherein in each unit, a pattern of a metal conductive paste including a co-material is printed on a dielectric green sheet of a dielectric material including a ceramic material powder, the ceramic material powder including a perovskite structure expressed by a general formula $ABO_3$ wherein A represents an A site element and B represents a B site element in which the A site element includes at least Ba, an A/B ratio by atomic concentration of the dielectric green sheet being 0.980 or less, a total amount of Ti, Zr and Hf being 90 mol % or more in metal elements included in the co-material, an amount of Ba in the metal elements being 10 mol % or less; and
   firing the multilayer structure and thereby forming a dielectric layer from the dielectric green sheet in each unit wherein a main component of the dielectric layer is barium titanate in which at least one of $ZrO_2$ and $HfO_2$ is solid-solved.

8. The method as claimed in claim 7, wherein a ratio of the co-material with respect to metal powder in the metal conductive paste is 5 mass % or more and 30 mass % or less.

9. The method as claimed in claim 7, wherein the co-material is $TiO_2$, $ZrO_2$ or $HfO_2$.

10. A ceramic electronic device comprising:
    a multilayer structure in which each of a plurality of dielectric layers and each of a plurality of internal electrode layers are alternately stacked,
    wherein a main component of the plurality of dielectric layers includes a perovskite structure expressed by a general formula $ABO_3$, wherein A represents an A site element and B represents a B site element in which the A site element includes at least Ba, and an A/B ratio by atomic concentration of the plurality of dielectric layers is 0.980 or less,
wherein the plurality of internal electrode layers include a co-material,
wherein a total amount of Ti, Zr and Hf is 90 mol % or more in metal elements included in the co-material and an amount of Ba is 10 mol % or less in the metal elements, and
wherein the plurality of dielectric layers include a core-shell structure having a core of which a main component is barium titanate and a shell which is a diffusion layer in which Ti, Zr or Hf is richer than the core.

* * * * *